United States Patent [19]
Maki et al.

[11] Patent Number: 5,613,227
[45] Date of Patent: Mar. 18, 1997

[54] TRANSCEIVER MEASURING BATTERY VOLTAGE WHEN NOT TRANSMITTING IN A TDMA SYSTEM

[75] Inventors: Katsuhisa Maki, Tokyo; Takaaki Ishii, Kanagawa-ken; Masaki Satou, Tokyo, all of Japan

[73] Assignee: Kabushiki Kaisha Toshiba, Kanagawa-ken, Japan

[21] Appl. No.: 184,139

[22] Filed: Jan. 21, 1994

[30] Foreign Application Priority Data

Jan. 21, 1993 [JP] Japan ..................................... 5-008243

[51] Int. Cl.⁶ ...................................................... H04B 1/40
[52] U.S. Cl. ............................ 455/127; 455/343; 455/89; 370/347
[58] Field of Search ..................... 370/95.1, 95.3; 340/825.44; 455/343, 127, 89, 33.1, 54.1; 379/58, 59; 320/2

[56] References Cited

U.S. PATENT DOCUMENTS

| 4,964,121 | 10/1990 | Moore | 455/343 |
| 5,095,308 | 3/1992 | Hewitt | 455/343 |
| 5,203,009 | 4/1993 | Bogusz et al. | 455/33.1 |
| 5,204,986 | 4/1993 | Ito et al. | 455/343 |
| 5,239,694 | 8/1993 | Toyoshima | 455/127 |
| 5,278,995 | 1/1994 | Hwang | 455/343 |

FOREIGN PATENT DOCUMENTS

| 0512711A2 | 11/1992 | European Pat. Off. . | |
| 0512711A3 | 11/1993 | European Pat. Off. . | |
| 49109 | 9/1991 | Japan | 455/343 |
| 4150625 | 5/1992 | Japan | 455/343 |
| 4176218 | 6/1992 | Japan | 455/343 |
| 4331518 | 11/1992 | Japan | 455/343 |
| WO90/09208 | 8/1990 | WIPO . | |

*Primary Examiner*—Andrew Faile
*Attorney, Agent, or Firm*—Finnegan, Henderson, Farabow, Garrett & Dunner, L.L.P.

[57] ABSTRACT

A radio telecommunication apparatus sends signals to a base station for a first period over radio channels established by a time division multiple access (TDMA) system. The apparatus has a battery whose voltage decreases in response to consumption of the battery. The apparatus measures the voltage of the battery only during a second period other than the first period and determines a remaining energy of the battery in response to the measured voltage.

5 Claims, 10 Drawing Sheets

| RESULT OF COMPARISON | DISPLAY |
|---|---|
| FIRST CRITERION $\leq V_{DET}$ | $75\% \leq$ REMAINING ENERGY $\leq 100\%$ |
| SECOND CRITERION $\leq V_{DET} <$ FIRST CRITERION | $50\% \leq$ REMAINING ENERGY $< 75\%$ |
| THIRD CRITERION $\leq V_{DET} <$ SECOND CRITERION | $25\% \leq$ REMAINING ENERGY $< 50\%$ |
| $V_{DET} <$ THIRD CRITERION | $0\% \leq$ REMAINING ENERGY $< 25\%$ |

TRANSCEIVER MEASURING BATTERY VOLTAGE WHEN NOT TRANSMITTING IN A TDMA SYSTEM

BACKGROUND OF THE INVENTION

1. Field of the Invention

The present invention relates to a radio telecommunication apparatus used in a radio telecommunication system, such as a motor vehicle radio telephone system or a portable radio telephone system. More particularly, the invention relates to a radio telecommunication apparatus and method capable of providing information to a user on the remaining energy of a battery in the apparatus.

2. Description of the Related Art

Figure 7:
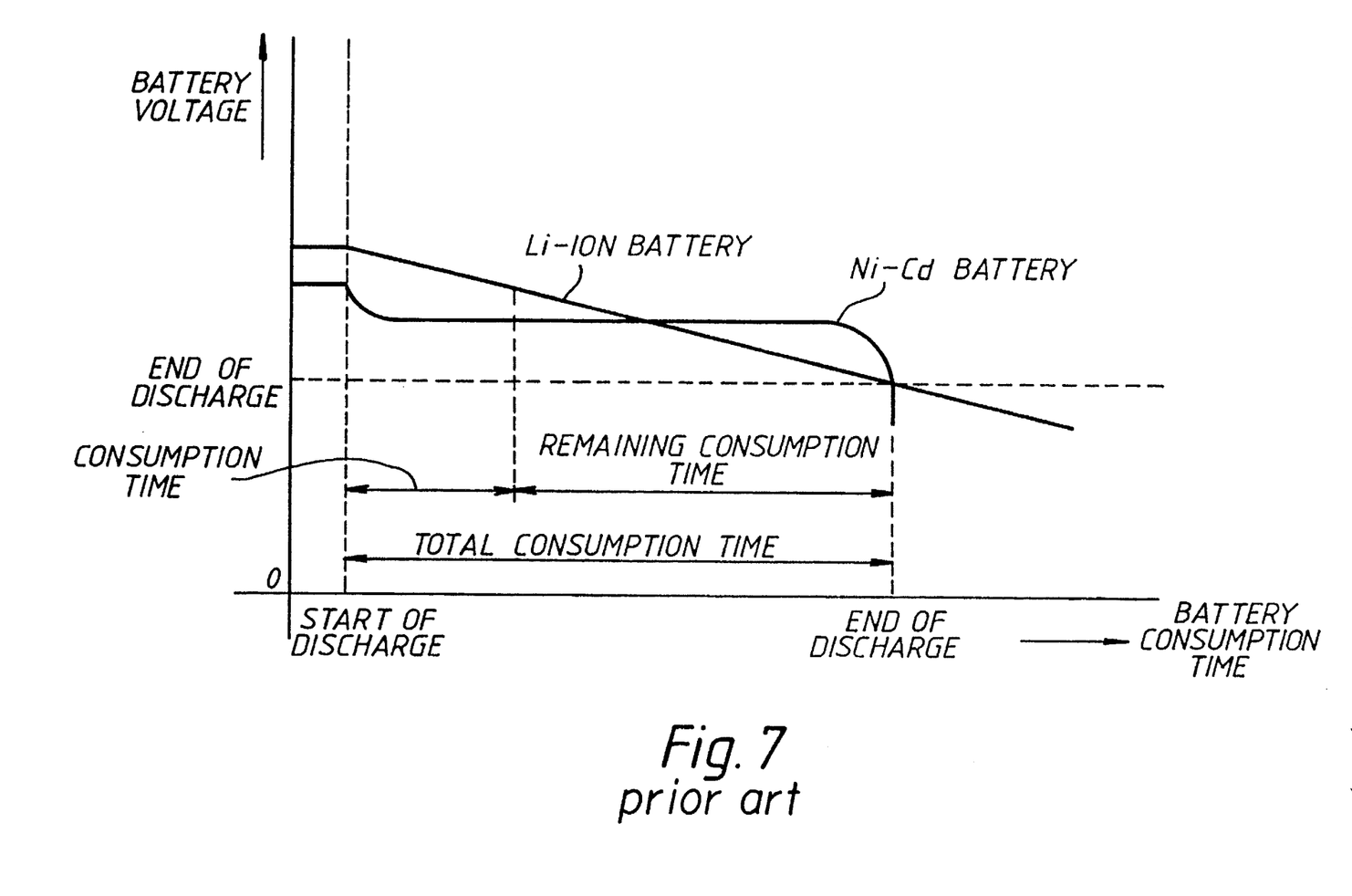
FIG. 7 is a graph illustrating the relationship between battery voltage and battery consumption time.

Recently radio communication apparatus have been reduced in size and weight. For this reason, a small and light battery is required in such apparatus. Some small and light batteries are known. One of such small and light batteries is a lithium ion battery, referred to herein as a Li-ion battery. This battery has more energy density per volume and weight than a Nickel-Cadmium battery (referred to herein as a Ni-Cd battery) used more frequently in the past. In addition the Li-ion battery has another feature. FIG. 7 shows the variation of the battery voltage of Li-ion and Ni-Cd batteries in response to battery consumption time, if the consumption current flowing in the battery is constant. Referring to FIG. 7, the Ni-Cd battery voltage is substantially constant during discharge, while the Li-ion battery voltage decreases as the discharge continues. Since the Li-ion battery voltage decreases in proportion to the Li-ion battery consumption time, an apparatus with a Li-ion battery can derives a remaining consumption time by subtracting the elapsed consumption time from a total consumption time. The remaining consumption time corresponds to the remaining energy of the battery. Therefore, the apparatus may recognize the remaining energy of a Li-ion battery by detecting the Li-ion battery voltage in proportion to the Li-ion battery consumption time.

However, if this method of detecting the remaining energy of the battery is applied to a digital radio communication apparatus, the following error occurs.

Figure 8:
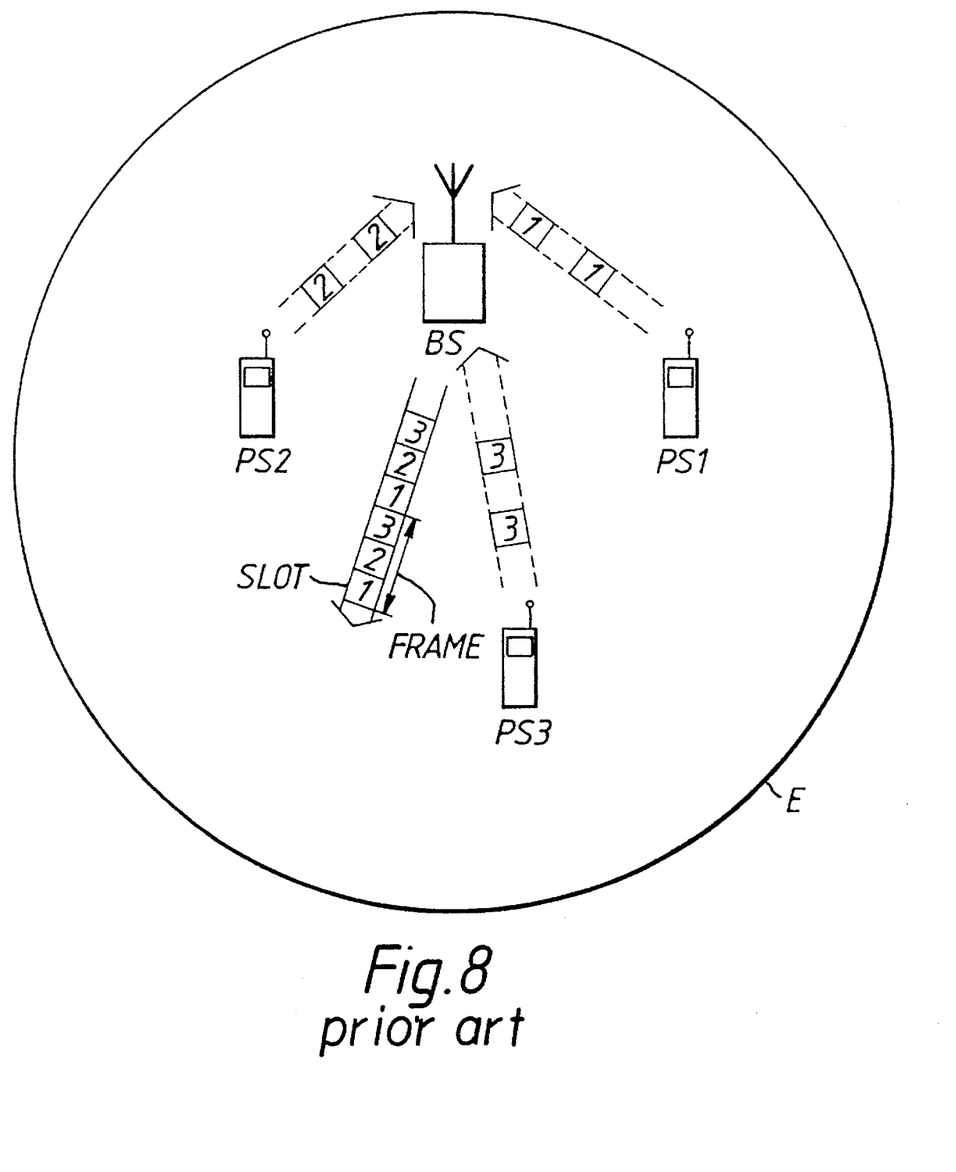
FIG. 8 is a block diagram illustrating a conventional time division multiple access (TDMA) system.
Figure 9:
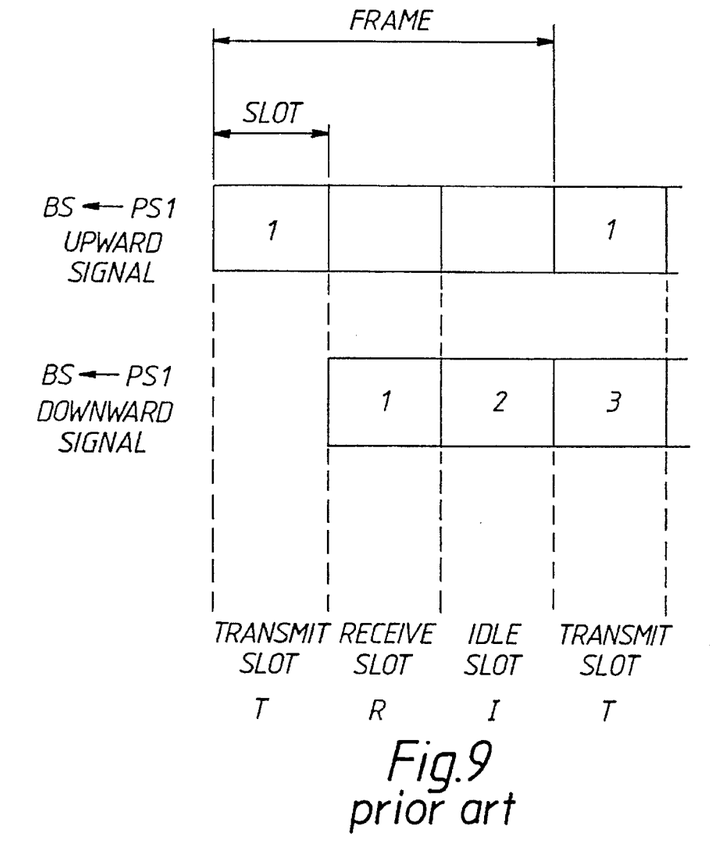
FIG. 9 is a upward signal format from the apparatus to a base station and a downward signal from the base station to the apparatus in the TDMA system.

A digital radio communication apparatus utilizes a time division multiple access system (called a TDMA system) as a communication system. FIG. 8 shows the basic concept of the TDMA system. Referring to FIG. 8, a base station BS sends a signal to portable radio apparatus PS1, PS2, PS3 in a service area E. The signal consists of a plurality of slots. Three slots constitute a frame. The signal is sent over a downward radio frequency channel. Each portable apparatus PS is assigned one slot of three slots. Each portable apparatus receives a downward signal during a period corresponding to the downward assigned slot. Therefore, the apparatus extracts information included only in the downward assigned slot. The portable apparatus PS sends an upward signal to the base station BS over an upward radio frequency channel. Each portable apparatus sends the upward signal during a period corresponding to an upward assigned slot. Therefore, the upward signal is intermittent. FIG. 9 shows upward and downward slots between the base station BS and the portable apparatus PS1. Referring to FIG. 9, the portable apparatus PS1 sends the intermittent upward signal to the base station BS using the upward slot #1. Further, the portable apparatus PS1 receives the downward signal during a period corresponding to downward slot #1. The upward and the downward slots #1 are referred to herein as the "transmit" slot and the "receive" slot. During a period corresponding to the downward slot #2, the apparatus PS1 sends and receives no signal. Therefore the slot corresponding to the slot #2 is referred to herein as an "idle" slot. The above three slots repeat in every frame.

Figure 10:
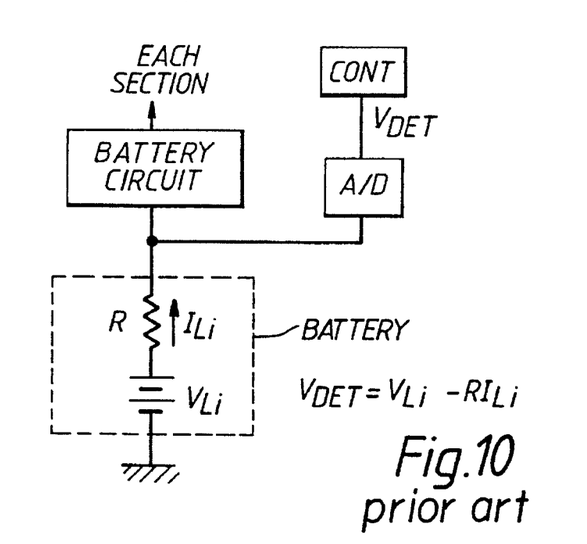
FIG. 10 is a block diagram illustrating a portion of the apparatus including the battery and the battery circuit connected to the battery.

FIG. 10 shows a block diagram of a conventional apparatus including the battery. Referring to FIG. 10, the battery has an internal resistance R. The battery is coupled to a battery circuit providing a predetermined voltage to each section and further coupled to an A/D convertor for converting an analog value of an output to a digital value thereof. The digitized battery voltage value $V_{DET}$ is provided to a control circuit. In this case, when the real voltage of the battery is defined as $V_{Li}$ and the current flowing through the battery as $I_{Li}$, the digitized battery voltage $V_{DET}$ is expressed by a following expression.

$$V_{DET} = V_{Li} - RI_{Li}$$

According to the above expression, the digitized battery voltage $V_{DET}$ varies in accordance with the current $I_{Li}$ flowing through the battery.

Figure 11:
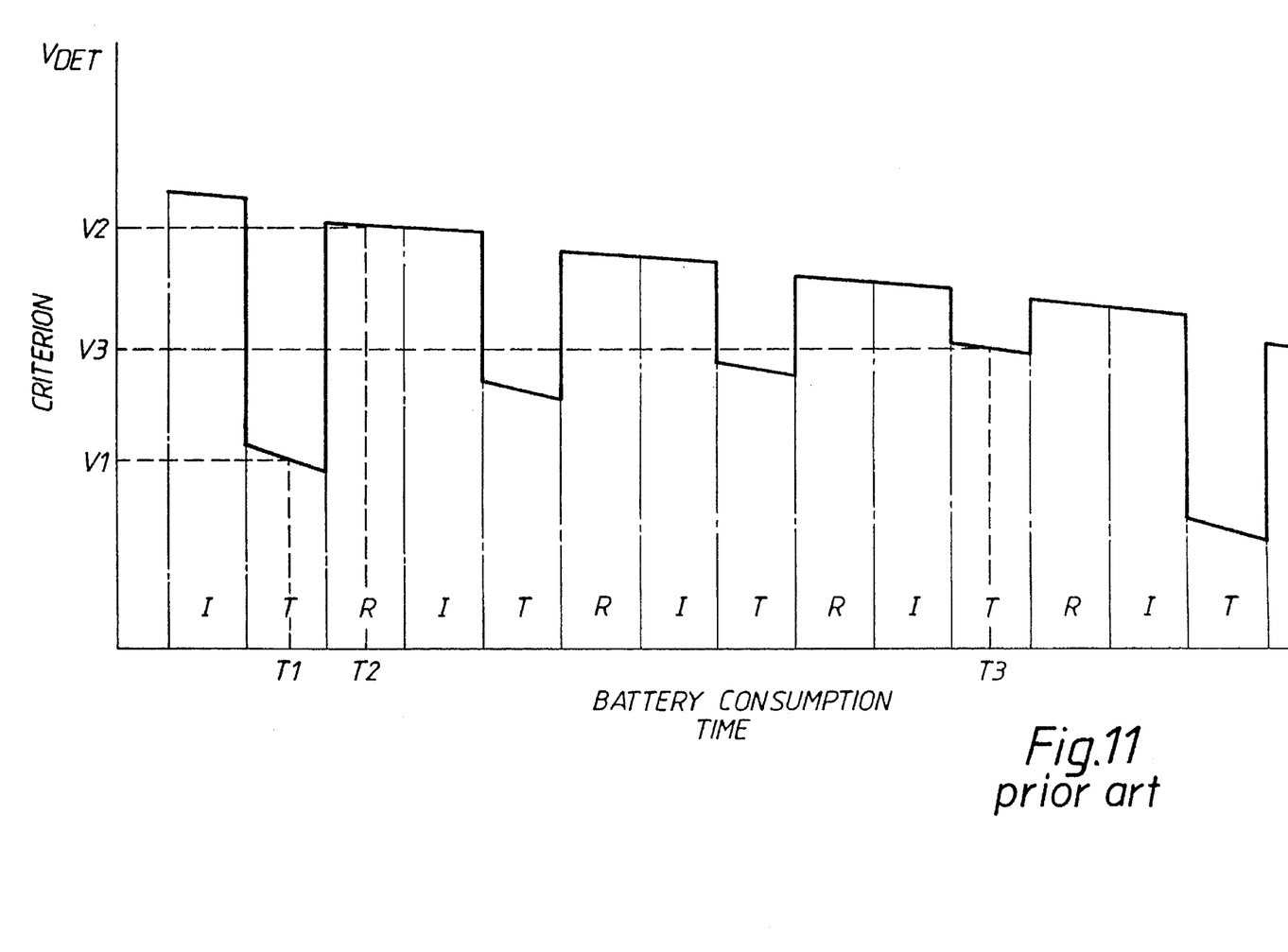
FIG. 11 shows the relationship between the battery voltage and the battery consumption time if the apparatus with the battery is communicating with the base station in the TDMA system.

In the portable digital apparatus, an average current flowing through the battery during the transmit slot period is from 450 mA to 750 mA, while an average current flowing through the battery during the receive slot period and the idle slot period is 150 mA. That is, the current $I_{Li}$ during the period corresponding to the transmit slot is much higher than that during the periods corresponding to the receive and idle slots. Therefore, referring to the expression (1), the Li-ion battery voltage $V_{DET}$ during the period corresponding to the transmit slot is much less than that during the periods corresponding to the receive and idle slots. FIG. 11 shows the relationship between the digitized Li-ion battery voltage $V_{DET}$ and the consumption time of the battery provided in the portable digital telecommunication apparatus. Referring to FIG. 11, the digitized battery voltage $V_{DET}$ during the period corresponding to the transmit slot T in a frame is much less than that during the period corresponding to the receive slot R in the frame and the idle slot I in the frame. For example, assume that, the digitized battery voltage $V_{DET}$ is V1(v) at the time T1 and the digitized battery voltage $V_{DET}$ is V2(v) at the time T2 after T1. A predetermined criterion is established to estimate remaining battery energy. If the above estimation is made between V1(v) and V2(v) to determine the remaining battery energy using the criterion, the following error occurs. The remaining energy of the battery at the time T1 is estimated to be lower than the predetermined criterion, while the remaining energy of the battery at the time T2 after T1 is estimated to be higher than the criterion. That is, in spite of the actual consumption of the battery, the remaining energy of the battery is incorrectly estimated at too high a level. This kind of error occurs if the portable digital communication apparatus derives the remaining energy of the battery from the detection of the digitized battery voltage $V_{DET}$ at any time.

Figure 12:
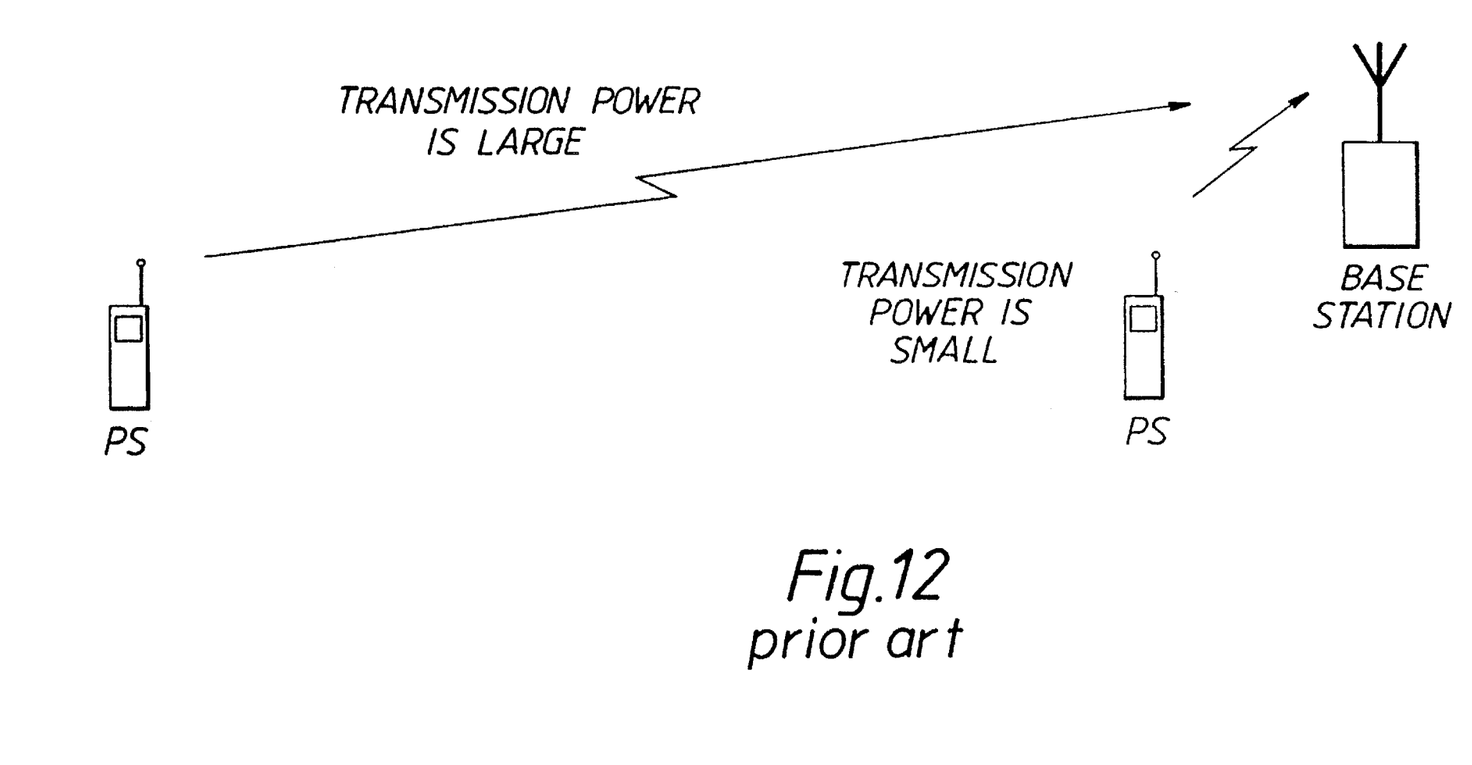
FIG. 12 is a block diagram illustrating the transmission power of the apparatus in the TDMA system.

Further, the battery consumption of current during the period of time corresponding to the transmit slot varies in accordance with a position of the portable apparatus in the service area E. This is because the transmission power of the portable apparatus varies according to the distance of the apparatus from the base station BS as shown in FIG. 12. When the portable apparatus PS is near the base station BS, the transmission power of the apparatus is small. When the apparatus PS is far from the base station BS, the transmission power of the apparatus is large. The transmission power has several values. As shown in FIG. 11, if the transmission power at the time T1 is higher than the transmission power at the time T3, and the battery voltage $V_{DET}$ at the time T3 is V3(v), a following error occurs. In spite of the passing of time and the reduction of battery energy, the battery voltage $V_{DET}$ is estimated to be increased between V1 to V3. This results in an estimate that the remaining energy of the battery is higher instead of lower.

Thus, if the battery voltage is detected during a time period including the transmit slot, the above-described error occurs.

SUMMARY OF THE INVENTION

Accordingly, the present invention has been made in view of the above circumstances and has an object to provide a digital radio telecommunication apparatus capable of properly estimating the remaining energy of the battery provided in the apparatus.

Additional objects and advantages of the invention will be set forth in part in the description which follows and in part will be apparent from the description, or may be learned by practice of the invention. The objects and advantages of the invention may be realized and attained by means of the instrumentalities and combinations particularly pointed out in the written description and claims hereof as well as the appended drawings. To achieve these and other objects and advantages and in accordance with the purposes of the invention, there is provided a radio telecommunication apparatus communicating with a base station over radio channels established by a time division multiple access (TDMA) system, the apparatus having a battery whose voltage decreases in response to consumption of the battery. The apparatus comprises recognizing means for recognizing whether the apparatus is sending signals to the base station, measuring means responsive to the recognizing means for measuring the voltage of the battery only when the apparatus is not sending the signals to the base station, and determining means responsive to the measuring means for determining a remaining energy of the battery in response to the measured voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention. In the drawings.

DESCRIPTION OF THE PREFERRED EMBODIMENTS

Reference will now be made in detail to the present preferred embodiments of the invention, examples of which are illustrated in the accompanying drawings.

A radio telecommunication apparatus in accordance with the present invention will be detailed with reference to the attached drawings.

Figure 1:
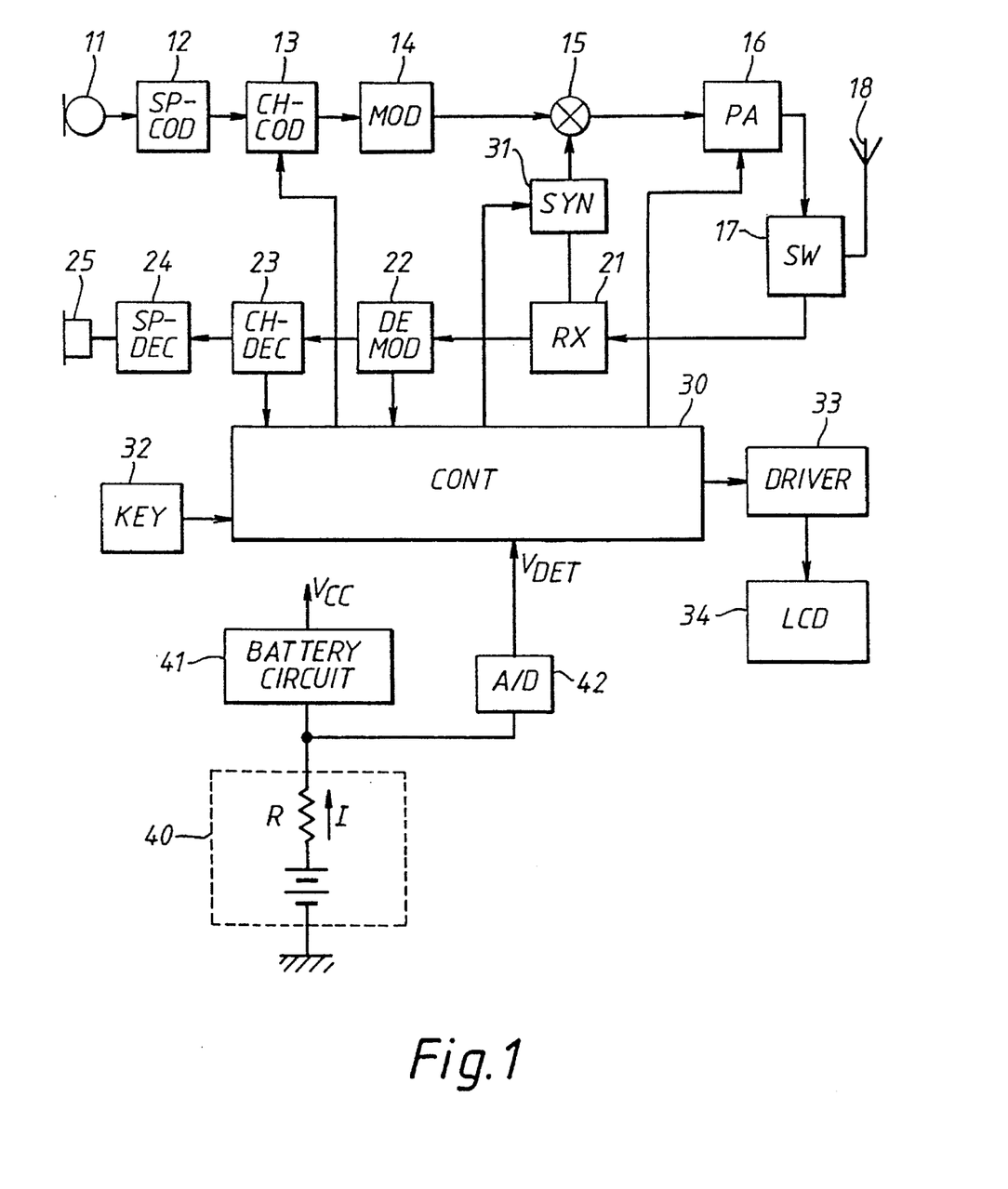
FIG. 1 is a block diagram illustrating an embodiment of a radio telecommunication apparatus according to the present invention.

FIG. 1 shows a block diagram of the mobile radio telephone apparatus referred to as the radio telephone apparatus in accordance with an embodiment of the present invention.

The radio telephone apparatus is roughly divided into transmission, reception and control sections. Reference numeral 40 denotes a power supply such as a battery. The transmission section comprises a microphone 11, a speech coder (SPCOD) 12, an error correction coder (CHCOD) 13, a digital modulator (MOD) 14, an adder 15, a power amplifier (PA) 16, a high frequency switch circuit (SW) 17 and an antenna 18.

A transmit audio signal from the microphone 11 is subjected at the speech coder 12 to a coding. The speech coder 12 outputs the digital transmit signal. The error correction coder 13 performs its error correction coding operation over the digital transmit signal and a digital control signal issued from a control circuit 30 (which is explained below).

The digital modulator 14 generates a modulation signal corresponding to a digital transmit signal issued from the error correction coder 13. The adder 15 adds the modulation signal received from the digital modulator 14 and a carrier signal received from a synthesizer 31 for frequency conversion. The power amplifier 16 amplifies a high frequency signal received from the adder 15 to a predetermined level and provides a transmit signal.

The high frequency switch is turned ON only for a period of time corresponding to a transmit time slot designated by the control circuit 30. During this time, the high frequency switch 17 receives the transmit signal from the power amplifier 16 and supplies it to the antenna 18. The transmit signal is transmitted toward a base station (not shown) in the form of a radio transmit signal.

The receiver section includes a receiver (RX) 21, a digital demodulator (DEMOD) 22, an error correction decoder (CHDEC) 23, a speech decoder (SPDEC) 24 and a receiver 25.

The receiver 21 performs its frequency converting operation over a radio receiver signal received from the antenna through the high frequency switch 17 and outputs a receive signal. The digital demodulator 22 performs bit and frame synchronizing operations over the receive signal received from the receiver 21 to obtain a synchronized signal and supplies the synchronized signal to the control circuit 30 and a demodulation signal to the error correction decoder 23. The bit and frame synchronizing operations are defined as a word synchronization. The error correction decoder 23 performs its error correction decoding operation over the digital demodulation signal received from the digital demodulation 22 to obtain a digital receive signal.

Further, the error correction decoder 23 provides a digital control signal for scanning channels and communication, to the control circuit 30.

The digital receive signal issued from the error correction decoder 23 is sent to the speech decoder 24. The speech decoder 24 performs its decoding operation over the digital receive signal to provide an analog receive signal. The analog receive signal is then applied to the speaker 25.

Further, the control section includes the aforementioned control circuit 30, the aforementioned frequency synthesizer (SYS) 31, key unit 32, an LCD driver 33 and an LCD 34. The synthesizer 31 generates an oscillation frequency necessary for radio communication with the base station under control of the control circuit 30.

Reference numeral 40 denotes a power supply such as a Li-ion battery. This battery is rechargeable. The Li-ion battery has an inner resistance R. The current of the battery 40 is referred to herein as current I. The Li-ion battery is connected to a battery circuit 41 and an analog/digital converter called as A/D converter 42. The battery circuit 41 receives an output voltage and changes the output voltage to a predetermined voltage Vcc. The predetermined voltage Vcc is supplied to each section in the apparatus. The A/D converter 42 converts the output analog voltage of the Li-ion battery 40 to a digital value $V_{DET}$ corresponding to the output analog voltage and provides the digital value $V_{DET}$ to the control circuit 30.

Figure 2:
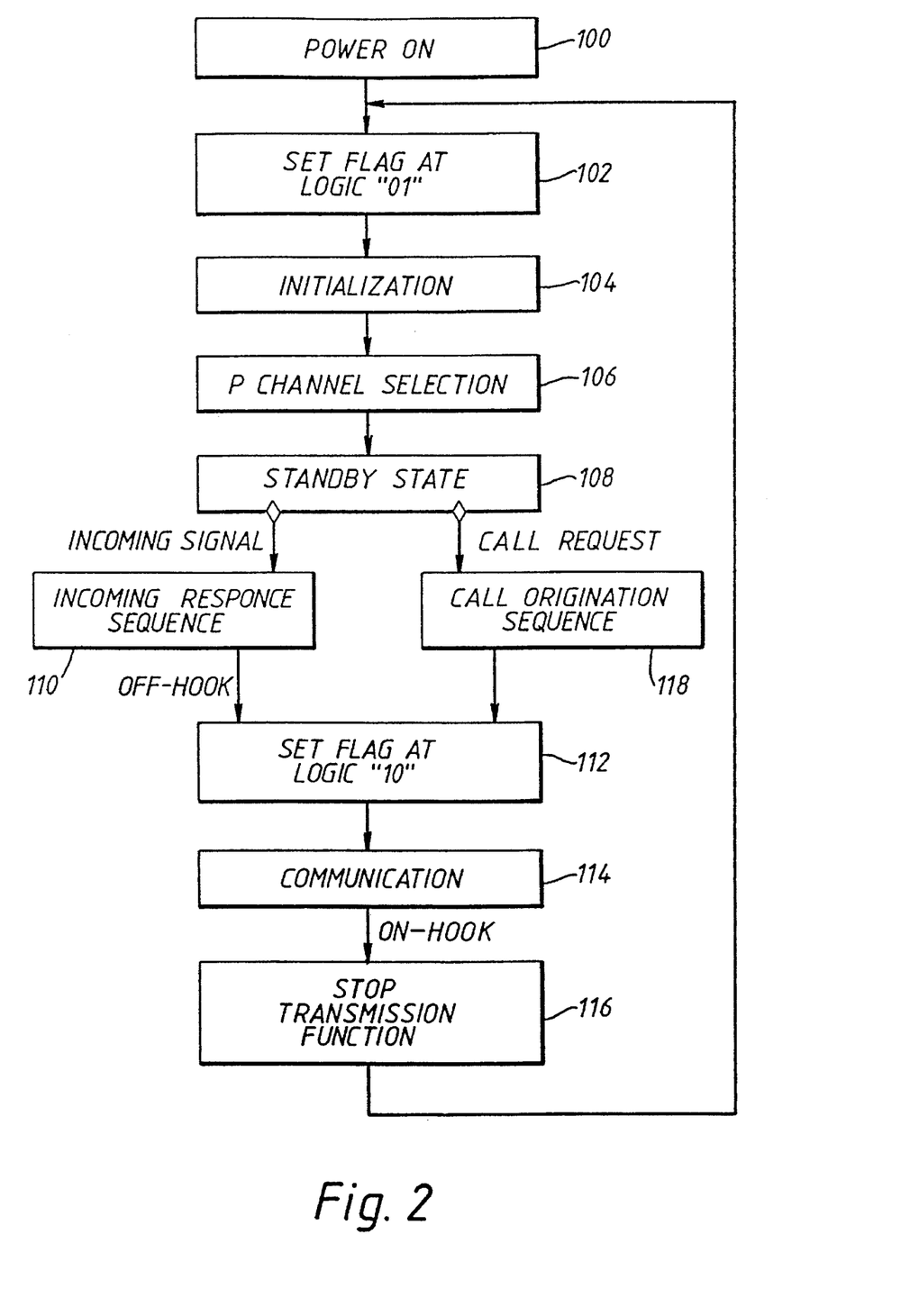
FIG. 2 is a flow chart illustrating a connection control operation sequence in an embodiment of the present invention.

FIG. 2 shows a connection control operation of the apparatus. When a power switch is turned on (step 100), the control circuit 30 sets a flag at a logic "01" (step 102). Thereafter an initialization operation is performed (step 104). In this operation, a predetermined range of control channels (referred to as D channels) is scanned to obtain the information indicative of electric field intensity of received signals over each channel. The channel having the strongest electric field intensity is selected from the D channels. The apparatus is ready for receiving signals through the D channel having the strongest electric field intensity.

The control circuit 30 performs bit and frame synchronization operations (referred to as a word synchronization) on signals received through the selected D channel.

In response to the synchronization operations, the control circuit 30 recognizes each period of time corresponding to a transmit slot, a receive slot and an idle slot. This performance is referred to herein as the recognition of slots. Therefore the control circuit 30 recognizes the slot corresponding to a given time. In response to the recognition of the time slot, the control circuit 30 controls the high frequency switch 17. The antenna 18 is coupled to the power amplifier 16 for a period of time corresponding to the transmit slot, and is coupled to the receiver 21 for a period of time corresponding to the receive slot. The antenna 18 is uncoupled for a period of time corresponding to the idle slot.

If the word synchronization is performed within a predetermined period of time, system information is detected through signals received through this D channel.

The system information includes a range of frequency channels (referred to as P channels hereinafter) to be scanned next. If the system information is detected within a predetermined period of time, the control circuit 30 scans P channels (step 106).

P channels are scanned to obtain the information indicative of the electric field intensity. The apparatus is ready for receiving information through the P channel having the strongest field intensity.

The word synchronization operation is performed on signals received through the P channel having the strongest field intensity. In this time, the recognition of slots is performed. After that, the control circuit 30 obtains a system information.

After receiving the system information, the control circuit 30 transmits a signal including a mobile identification number and the electric field intensity of the system information to a base station. Thereafter the control circuit 30 sets the apparatus to a standby state (step 108).

In this state, if the apparatus receives an incoming call signal, an incoming response sequence is performed (step 110).

After detecting the incoming call signal, the control circuit 30 causes the demodulator to scan each predetermined control channel (defined as an A channel) to obtain reception electric field intensity information.

Next, a word synchronization is performed on signals received through the selected A channel (step 404). In this time, the above-described recognition of slots is performed. If the word synchronization is performed within a predetermined period of time, a system information is detected by signals received through this A channel. If the system information is detected within a predetermined period of time, the control circuit sends a receive acknowledge signal through the selected A channel to the base station.

If the base station receives the receive acknowledge signal from the mobile radio telephone apparatus within a predetermined period of time, the base station transmits the signal including the information indicative of designated speech channels. Otherwise, the base station does not transmit the signal.

Thereafter, a signal including an information indicative of designated speech channels is received. When the signal is received within a predetermined period of time, A channels are switched to the designated speech channels. The designated speech channels include a forward channel for transmitting audio signals to the base station and a backward channel for receiving audio signals from the calling apparatus. Thus, a communication link between a calling telephone apparatus and the called apparatus is established.

After the control circuit captures designated speech channels, the apparatus is set into a ringing signal reception standby state for receiving an incoming signal. When the ringing signal is received, the apparatus generates a ringing tone. In this state, the apparatus is set to await a user's response.

When the user responds to the ringing tone by lifting the handset or depressing a "SEND" key, the control circuit 30 sets the flag at a logic "10" (step 112). Thereafter, the control circuit 30 performs a communication with the calling party to be called (step 114).

During communication, when the user replaces the handset on-hook, the communication through speech channels is ceased. Thereafter, when the transmission function is disabled (step 116), the initialization is resumed (step 102).

In the standby state in step 108 of FIG. 2, when a call request is detected by an input at the key unit 32 or a voice dialing, a call origination operation starts (step 118).

The control circuit causes the demodulator to scan each predetermined A channel (control channel) to obtain reception electric field intensity information. The apparatus is set to receive signals through the control channel having the strongest intensity.

Next, the word synchronization operation is performed on signals received through the selected A channel (step 504). In this time, the designation of time slots is performed. If the word synchronization operation is performed within a predetermined period of time, a system information is detected from signals received through this control channel.

If the control circuit detects that the user's action to make a call is confirmed and an appropriate control channel for broadcast of an origination signal is selected, a call origination signal including the telephone number to be called, which is entered by the user and a mobile identification number of the apparatus, is transmitted over this control channel.

Thereafter, the apparatus detects whether the acknowledge signal from the base station has been received.

The acknowledge signal includes an information indicative of designated speech channels. The base station calls the other party to be called on the basis of the telephone number included in the origination signal. When the acknowledge signal is received within a predetermined period of time, a communication link over the designated channels may then be established between the apparatus and the called apparatus. Otherwise, the initialization is resumed (step 102).

After the communication link is established between the apparatus and the called apparatus, the control circuit 30 sets the flag at a logic "10" (step 112). Thereafter, the control circuit 30 performs a communication with the calling party (step 114).

During communication, when the user replaces the handset on-hook, the communication through speech channels is ceased. Thereafter, when the transmission function is disabled, the initialization is resumed (step 102).

Figure 3:
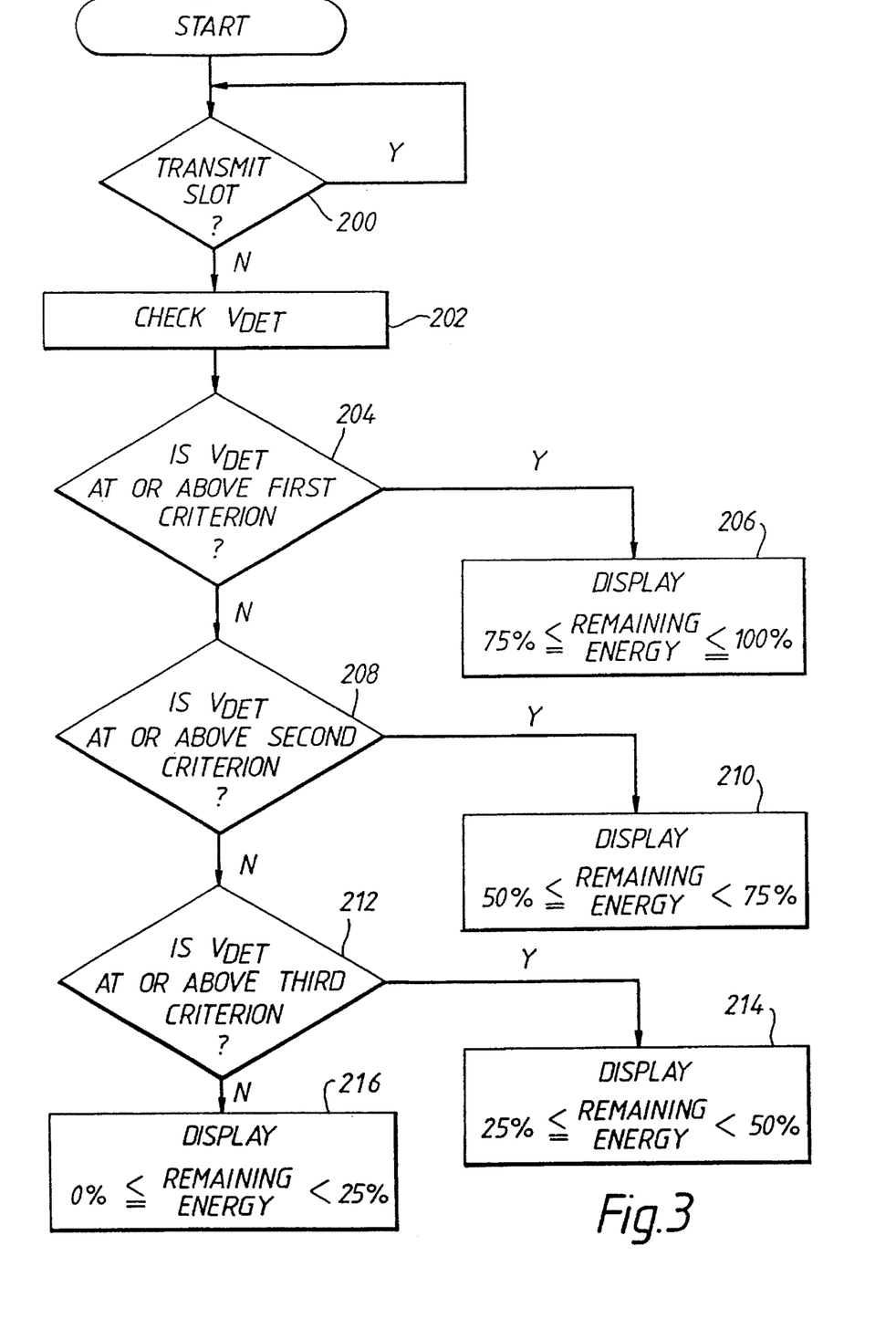
FIG. 3 is a flow chart illustrating a first embodiment for determining the remaining energy of a battery in the apparatus.

FIG. 3 shows a first embodiment of an operation of measuring the remaining energy of the Li-ion battery.

The control circuit 30 recognizes each period of time corresponding to the transmit slot, the receive slot and the idle slot in response to the word synchronization operation. Therefore, the control circuit recognizes the slot corresponding to a present time. In response to the recognition, the control circuit 30 checks whether the apparatus is sending signals to the base station. That is, the control circuit 30 checks whether the present time is in the period of time corresponding to the transmit slot (step 200). The control circuit 30 repeats the check as long as the present time is in the period of time corresponding to the transmit slot. If the present time is in a period of time corresponding to the receive slot or the idle slot, the control circuit 30 checks the digitized battery voltage $V_{DET}$ (step 202). Thereafter, the digitized battery voltage $V_{DET}$ is compared to each of several established criterion. The relationship between each of three criteria is shown as follows, with the first, second and third criterion defined as V1, V2 and V3.

V1>V2>V3

Firstly, the digitized battery voltage $V_{DET}$ is compared to the first criterion (step 204). If the digitized battery voltage $V_{DET}$ is at or above the first criterion V1, the control circuit 30 displays "75% ≦REMAINING ENERGY≦100%" (step 206). Otherwise, the digitized battery voltage $V_{DET}$ is compared to the second criterion V2 (step 208). If the digitized battery voltage $V_{DET}$ is at or above the second criterion V3, the control circuit 30 displays "50%≦REMAINING ENERGY<75%" (step 210). Otherwise, the digitized battery voltage $V_{DET}$ is compared to the third criterion (step 212) V3. If the digitized battery voltage $V_{DET}$ is at or above the third criterion V3, the control circuit 30 displays "25%≦REMAINING ENERGY<50%" (step 214). Otherwise, the control circuit 30 displays "0%≦REMAINING ENERGY<25%" (step 216).

Figure 4:
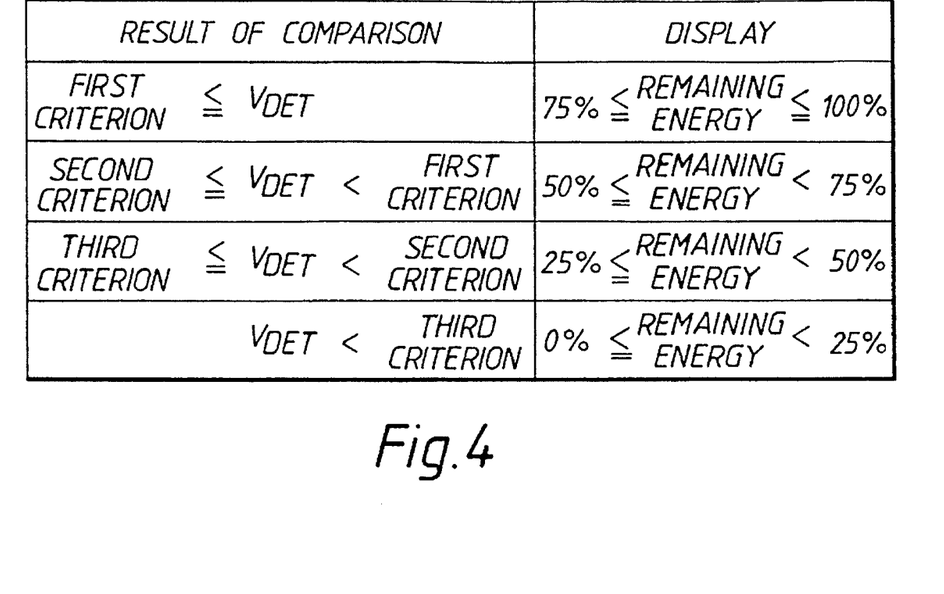
FIG. 4 is a table illustrating the content of the determined remaining energy of a battery.

FIG. 4 shows the contents of the display in response to the result of the comparison of the digitalized battery voltage $V_{DET}$ to each criterion.

In the above embodiment, the control circuit 30 detects the battery voltage only during a period of time corresponding to a slot other than the transmit slot. The current flowing through the battery is substantially constant during the period of time corresponding to the receive and idle slots. Thus, the battery voltage decreases in response to the battery consumption of time during these periods. Therefore, the control circuit 30 derives the remaining energy of the battery from the battery voltage during these periods. As a result, the control circuit 30 is able to inform the user of the apparatus more accurately of the remaining energy of the battery.

Figure 5:
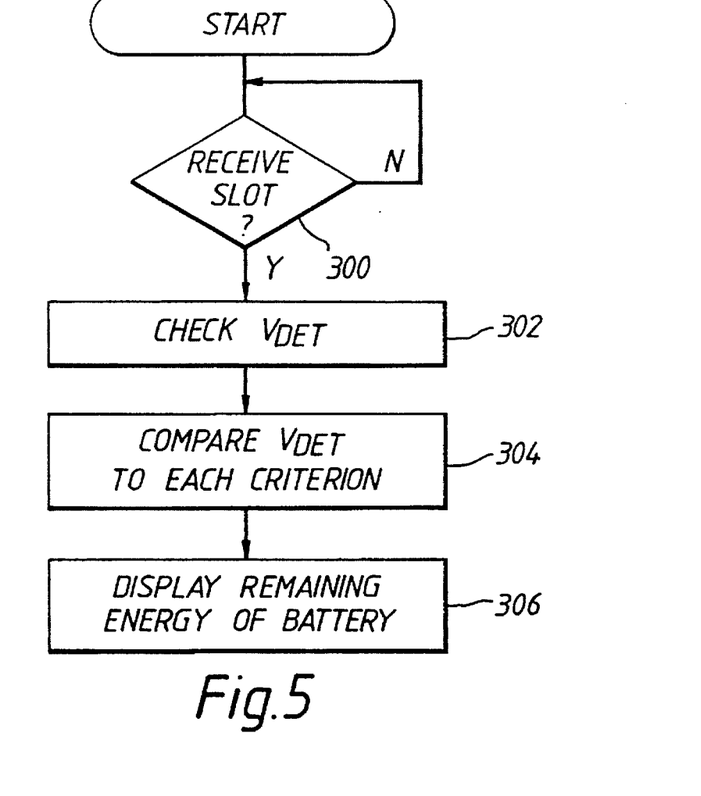
FIG. 5 is a flow chart illustrating a second embodiment for determining the remaining energy of a battery in the apparatus.

FIG. 5 shows a second embodiment of the present invention. The second embodiment differs from the first embodiment with respect to the period of time during which the digitized battery voltage $V_{DET}$ is checked and compared to each criterion. Referring to FIG. 5, the control circuit checks whether the present time is in the period of time corresponding to the receive slot (step 300).

The control circuit 30 repeats the check as long as the present time is not in the period of time corresponding to the receive slot. If the present time is in the period of time corresponding to the receive slot, the control circuit 30 checks the digitized battery voltage $V_{DET}$ (step 302). Steps from 302 to 306 are the same as the steps from 202 to 216 in FIG. 3. Therefore, explanations relating to steps from 302 to 306 are omitted.

Although in the second embodiment, the digitized battery voltage $V_{DET}$ is compared to each criterion during only the period of time corresponding to the receive slot, $V_{DET}$ may be compared to each criterion during only a period of time corresponding to the idle slot.

Figure 6:
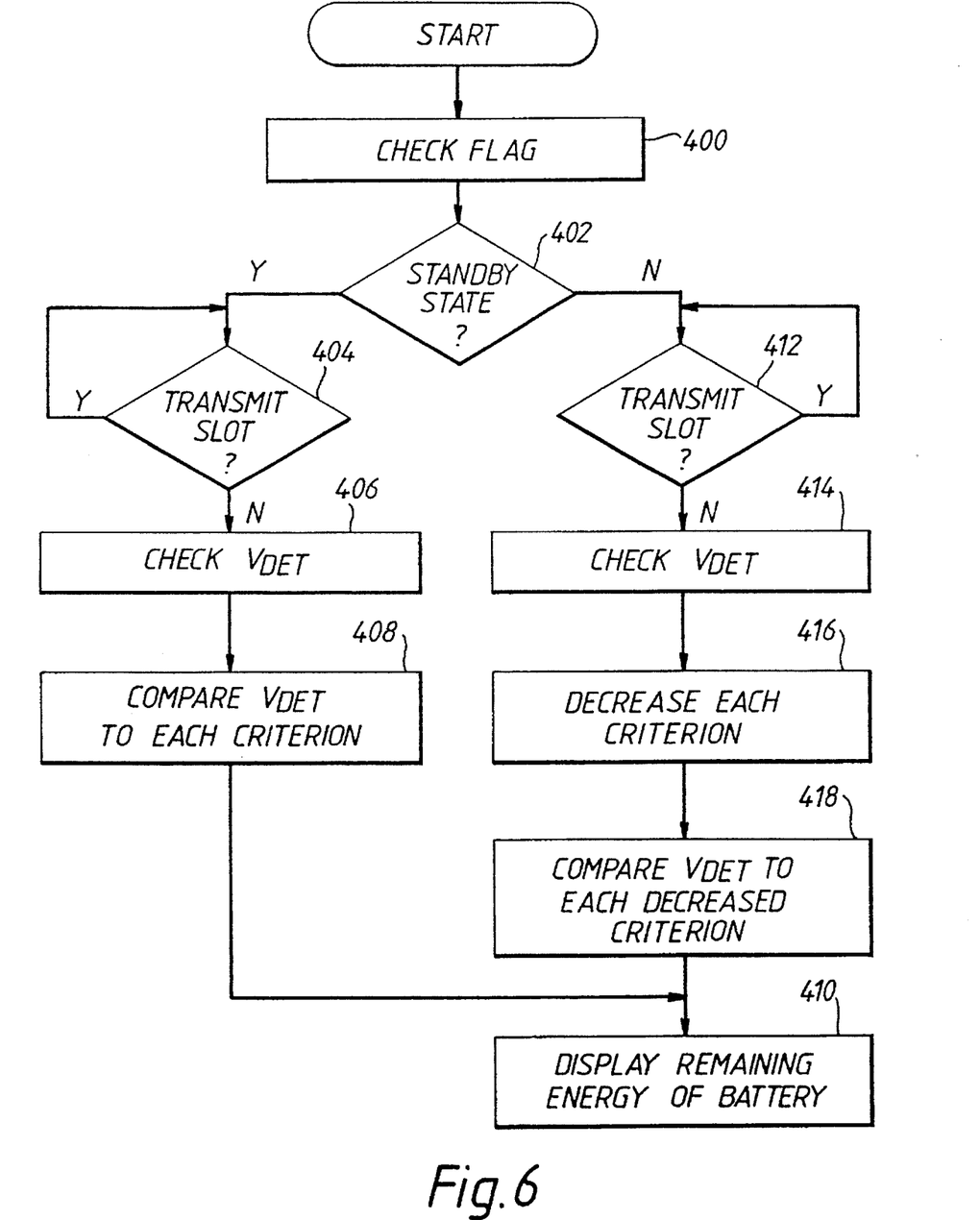
FIG. 6 is a flow chart illustrating a third embodiment for determining the remaining energy of a battery in the apparatus.

FIG. 6 shows a third embodiment of the present invention. The third embodiment differs from the above two embodiments with respect to the criteria compared to the digitized battery voltage $V_{DET}$. The control circuit 30 checks the flag referred to FIG. 2 (step 400 in FIG. 6). The control circuit 30 checks whether the apparatus is set to be in the standby state in response to the value of the flag (step 402). If the flag is set to be a logic "01", the control circuit 30 determines that the apparatus is set to be in the standby state. In this case, the control circuit 30 checks whether the present time is in a period of time corresponding to a slot other than the transmit slot (step 404). Steps from 404 to 410 are same as the steps from 200 to 216 in FIG. 3. Therefore, explanation of the steps from 404 to 410 are omitted.

If the flag is set to be a logic "10" in the step 402, the control circuit 30 determines that the apparatus is set to be in the communication state. In the communication state, the control circuit 30 sends and receives signals including audio information and control information. While in the standby state, the control circuit 30 sends and receives signals including only control information. Therefore, during only a period of time corresponding to the communication state, the speech-coder and the speech-decoder are used. As a result, the current flowing in the apparatus during the period of time corresponding to the communication state is larger than that during a period of time corresponding to the standby state. Therefore, the digitized battery voltage $V_{DET}$ in the communication state is smaller than that in the standby state. For this reason, the control circuit 30 decreases each criterion.

If the present time is in a time period corresponding to the slot other than the transmit slot (step 412), the digitized battery voltage $V_{DET}$ is checked (step 414). The control circuit 30 repeats the check as long as the present time is in the period of time corresponding to the transmit slot. After the step 414, the control circuit 30 decreases each criterion so that the control circuit 30 compensates the digitized battery voltage $V_{DET}$ in the communication state to be smaller than that in the standby state (step 416). Thereafter, the control circuit 30 compares the digitized battery voltage $V_{DET}$ to each decreased criterion (step 418). The way of comparing $V_{DET}$ to each decreased criterion (step 418) and displaying the remaining energy of the Li-ion battery (step 410) is the same as the way in the first embodiment.

This invention is not limited to the above embodiment. In the above embodiment, the detection of the voltage of the Li-ion battery provided in the apparatus has been explained. However, since other batteries such as lead batteries, alkali batteries or manganese batteries have a feature in which the battery voltage decreases in response to battery consumption, these kinds of batteries also may be used with the apparatus.

We claim:

1. A radio telecommunication apparatus communicating with a base station over radio channels established by a time division multiple access (TDMA) system, wherein the apparatus communicates with another apparatus via the base station over a speech channel of the radio channels in a first state and the apparatus communicates with only the base station over a control channel of the radio channels in a second state, the apparatus having a battery whose voltage decreases in response to consumption of the battery, the apparatus comprising:

recognizing means for recognizing whether the apparatus is sending signals to the base station;

measuring means responsive to the recognizing means for measuring the voltage of the battery only when the apparatus is not sending signals to the base station;

comparing means responsive to the measuring means for comparing the measured voltage of the battery with at least one first predetermined criterion when the apparatus is in the first state and for comparing the measured voltage of the battery with at least one second predetermined criterion when the apparatus is in the second state; and converting means responsive to the measuring means for converting the measured voltage of the battery into a value.

2. A radio telecommunication apparatus sending signals to a base station for a send period over radio channels established by a time division multiple access (TDMA) system, wherein the apparatus communicates with another apparatus via the base station over a speech channel of the radio channels in a first state and the apparatus communicates with only the base station over a control channel of the radio channels in a second state, the apparatus having a battery whose voltage decreases in response to consumption of the battery, the apparatus comprising:

recognizing means for recognizing a non-send time other than the send period;

measuring means responsive to the recognizing means for measuring voltage of the battery only at the non-send time;

comparing means responsive to the measuring means for comparing the measured voltage of the battery with at least one first predetermined criterion when the apparatus is in the first state and for comparing the measured voltage of the battery with at least one second predetermined criterion when the apparatus is in the second state; and determining means responsive to the measuring means for determining a remaining energy of the battery in response to the result of the comparison.

3. The apparatus of claim 2 wherein each first criterion is smaller than each second criterion.

4. A method of determining a remaining energy of a battery provided in a radio telecommunication apparatus, the apparatus communicating with a base station over radio channels established by a time division multiple access (TDMA) system, wherein the apparatus communicates with another apparatus via the base station over a speech channel of the radio channels in a first state and the apparatus communicates with only the base station over a control channel of the radio channels in a second state, the voltage of the battery decreasing in response to consumption of the battery, the method comprising the steps of:

recognizing whether the apparatus is sending signals to the base station;

measuring the voltage of the battery only when the apparatus is not sending signals to the base station;

comparing the measured voltage of the battery with at least one first predetermined criterion when the apparatus is in the first state and for comparing the measured voltage of the battery with at least one second predetermined criterion when the apparatus is in the second state; and converting the measured voltage of the battery into a value.

5. A method of determining a remaining energy of a battery provided in a radio telecommunication apparatus, the apparatus sending signals to a base station for a send period over radio channels established by a time division multiple access (TDMA) system, wherein the apparatus communicates with another apparatus via the base station over a speech channel of the radio channels in a first state and the apparatus communicates with only the base station over a control channel of the radio channels in a second state, the apparatus having a battery whose voltage decreases in response to consumption of the battery, the method comprising the steps of:

recognizing for recognizing a non-send time other than the send period;

measuring voltage of the battery only at the non-send time;

comparing the measured voltage of the battery with at least one first predetermined criterion when the apparatus is in the first state and for comparing the measured voltage of the battery with at least one second predetermined criterion when the apparatus is in the second state; and determining a remaining energy of the battery in response to the result of the comparison.

* * * * *